Nov. 26, 1935.   J. L. ORCHARD   2,022,515
TEMPERATURE MEASURING DEVICE
Filed Feb. 16, 1928   4 Sheets-Sheet 1

Inventor
John Liddon Orchard
By David Rines
Attorney

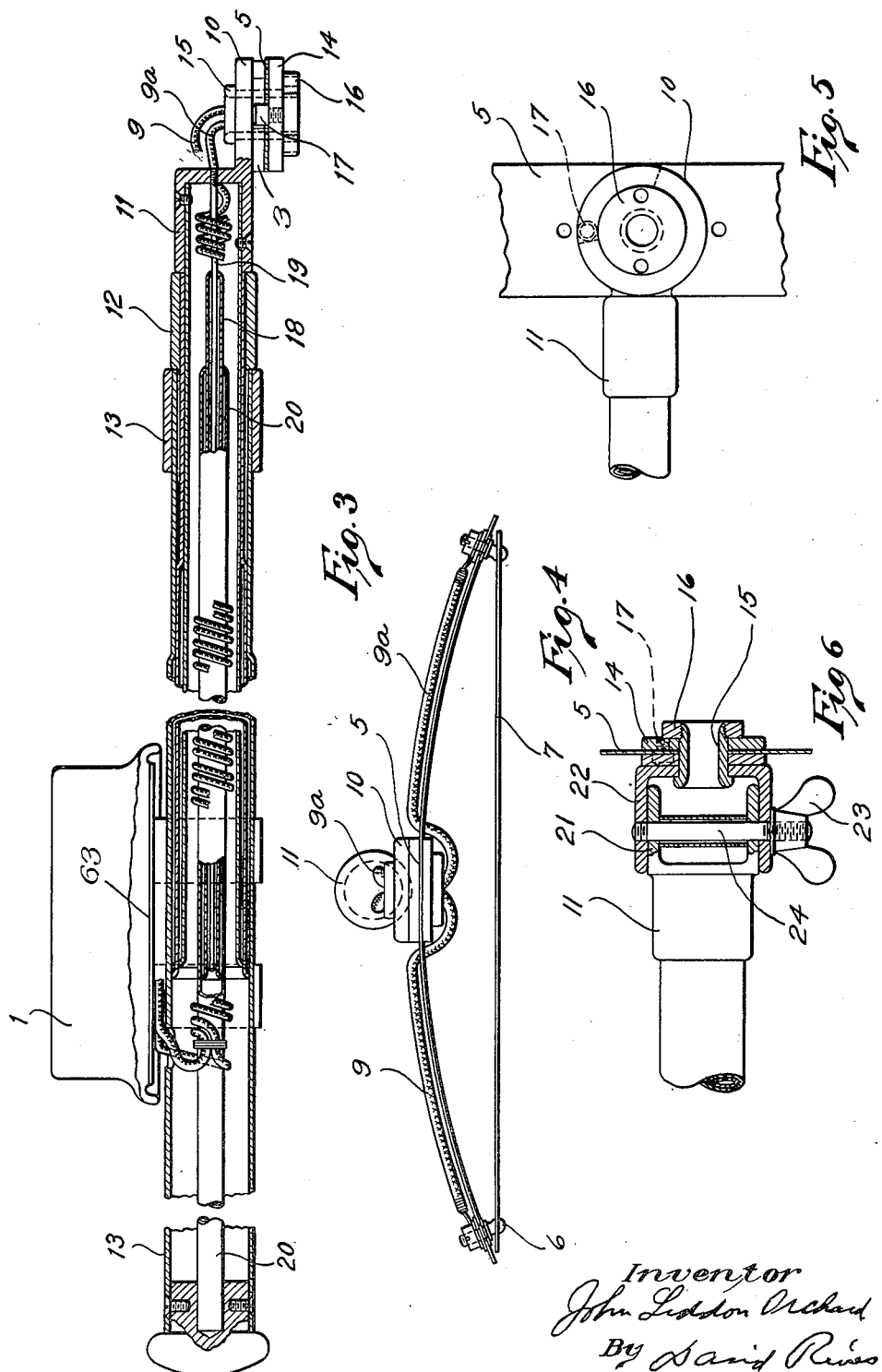

Nov. 26, 1935.   J. L. ORCHARD   2,022,515
TEMPERATURE MEASURING DEVICE
Filed Feb. 16, 1928    4 Sheets-Sheet 3

Inventor
John Liddon Orchard
By David Rives
Attorney

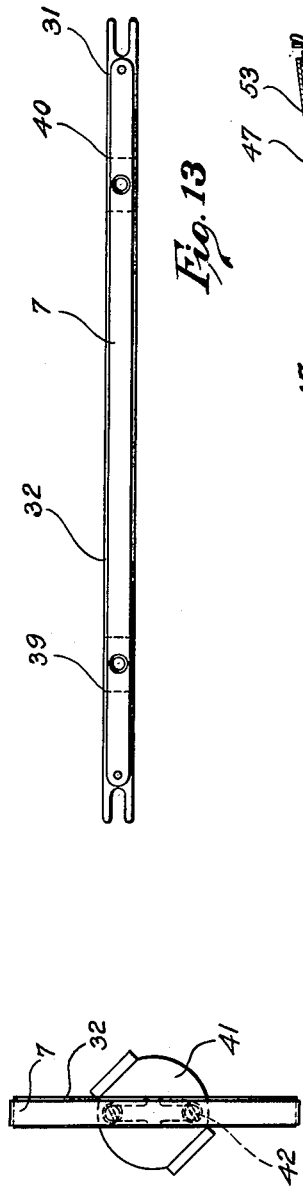
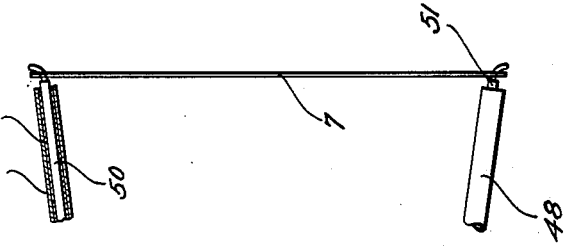
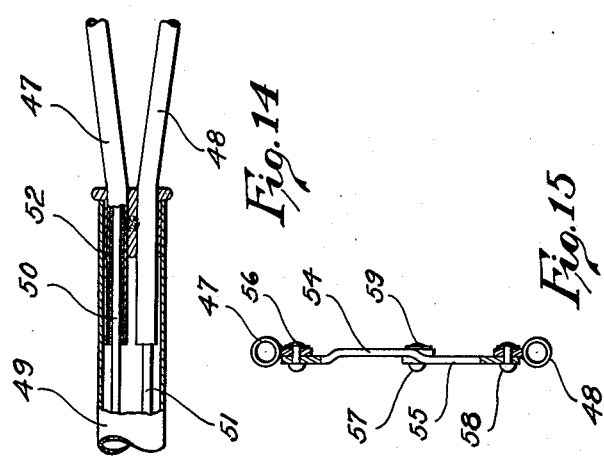
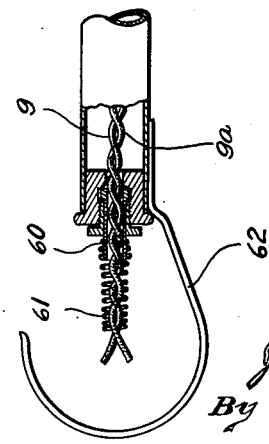

Patented Nov. 26, 1935

2,022,515

UNITED STATES PATENT OFFICE 2,022,515

TEMPERATURE MEASURING DEVICE

John Liddon Orchard, Cambridge, England, assignor to Cambridge Instrument Company, Limited, London, England, a corporation of Great Britain Application February 16, 1928, Serial No. 254,811
In Great Britain November 11, 1927

16 Claims. (Cl. 73—32)

The present invention relates to temperature-measuring instruments, and more particularly to pyrometers of the type illustrated and described in Letters Patent of Great Britain, No. 248,301.

Figure 1:
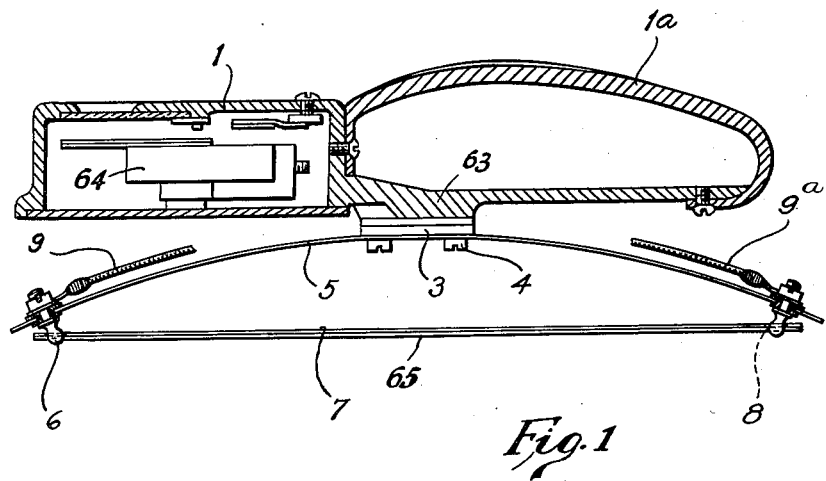
Figure 2:
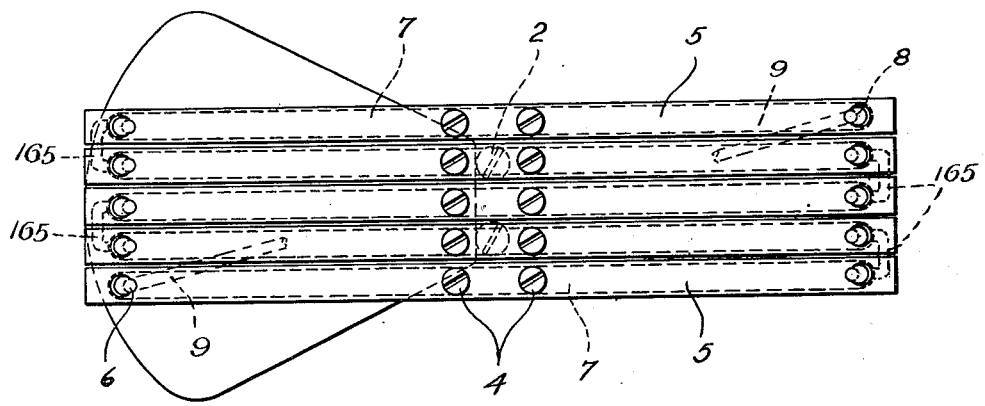
Figures 7, 8:
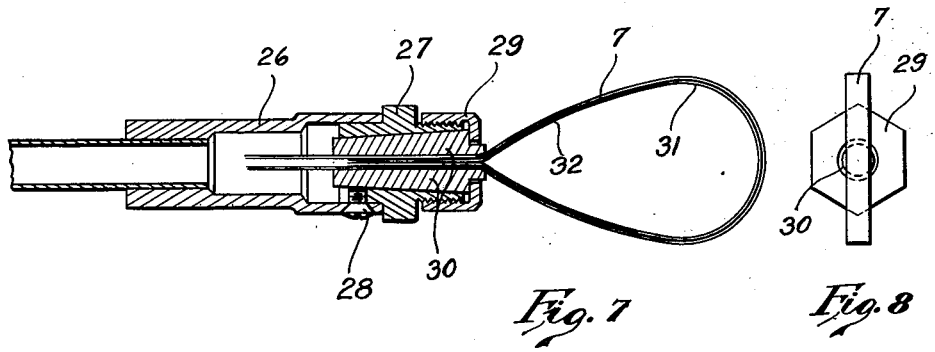
Figure 9:
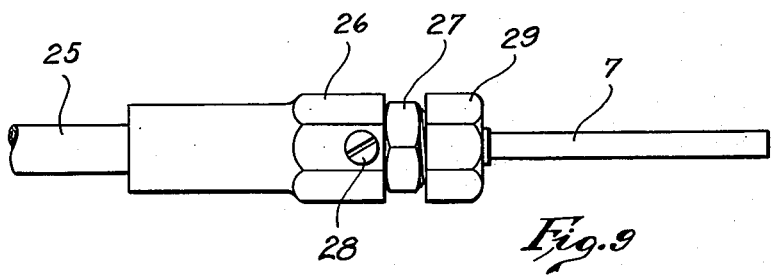
Figure 10:
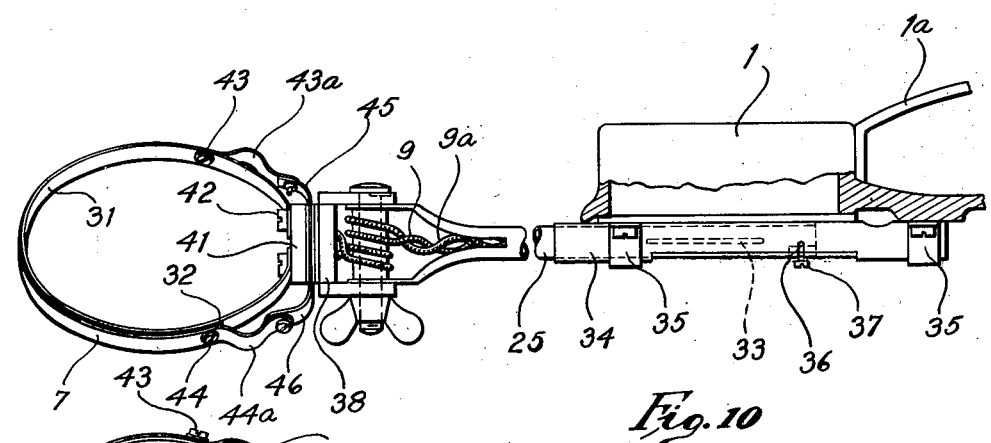
Figure 11:
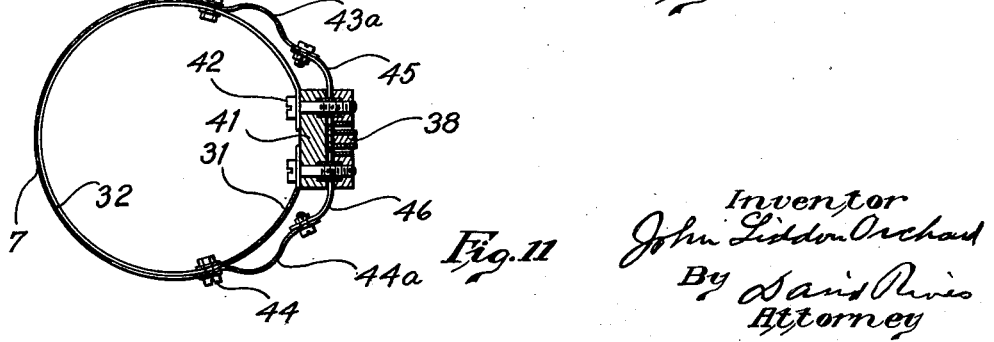

The nature and the objects of the invention will be explained in connection with the accompanying drawings, in which Fig. 1 is an elevation, partly in section, of a low-temperature surface pyrometer constructed in accordance with a preferred embodiment of the present invention; Fig. 2 is an underside plan of the same, the thermo-couple strips being shown by dotted lines, for clearness; Fig. 3 is a longitudinal section, partly in elevation, of a modification; Figs. 4 and 5 are an elevation and a plan, respectively, of the thermo-couple end of the modification shown in Fig. 3; Fig. 6 is a part-sectioned view of an alternative construction of the thermo-couple end of the modification shown in Fig. 3; Fig. 7 is a longitudinal section of a pyrometer mounted on a rod and adapted for application to small concave surfaces; Figs. 8 and 9 are end and side elevations, respectively, of the thermo-couple end of the modification shown in Fig. 7; Fig. 10 is a broken elevation, partly in longitudinal section, of a pyrometer for use with concave surfaces; Fig. 11 is a detail view of the pyrometer end of the modification shown in Fig. 10; Fig. 12 is an end view of the modification shown in Fig. 10; Fig. 13 is a detail view of the pyrometer-strip member shown in Figs. 10, 11 and 12; Fig. 14 is a broken view of a pyrometer for high temperatures, with the strip in flat form held remote from the operator; and Fig. 15 is a part-sectional view of the toggle joint shown in Fig. 14 for locking the tension on the strip.

In the above-described Letters Patent, there is disclosed what may be termed a normal pyrometer, comprising, with particular reference to Fig. 1 of the drawings accompanying herewith, a thin, sensitive, thermo-couple strip 7, having a junction at an intermediate point, and supported at the ends of a flat, steel spring strip 5. As the thermo-couple strip 7 is shorter than the spring strip 5, the latter becomes bowed into arcuate form and the former becomes stretched into flat condition. Suitably insulated leads 9 and 9a connect opposite ends of the thermo-couple strip 7 to a millivoltmeter or other indicating instrument 64 in a casing 1 carried by a frame or support 63. In operation, the instrument is held by a handle 1a that is also carried by the frame or support 63, and the thermo-couple strip 7 is pressed at the intermediate point against the object the temperature of which it is desired to measure. A normal pyrometer of this character may be so designed as to yield a full-scale deflection for a temperature rise of 150° C.

In order to adapt the instrument for lower temperatures, a plurality of thermo-couple strips 7 are employed, in accordance with the preferred embodiment of the present invention illustrated in Figs. 1 and 2, electrically connected together in series, as by means of conductors 165. If five thermo-couple strips 7 are employed, for example, as illustrated in Figs. 1 and 2, the same temperature difference will cause a reaction between five hot-and-cold junctions, instead of only one, and the instrument will indicate an electromotive-force difference five times as great as would be the case if a normal pyrometer were used. The number of thermo-couple strips 7 may be increased or decreased, as may be necessary for the particular measurement in question.

In accordance with the specific embodiment of the invention that is illustrated in Figs. 1 and 2, each thermo-couple strip 7 is mounted upon a separate resilient strip 5. To render the thermo-couple strips 7 readily attachable and detachable, each end of each strip 7 is provided with an opening 8 for receiving a metal pin or other conducting projection 6. A projection 6 is mounted upon, and insulated from, each end of each strip 5. The projections 6 serve also as terminals for the leads 9 and 9a and should preferably be constituted of the same metal as that of which the thermo-couples are made. The strips 5 are intermediately secured, as by means of screws 4, to the underside of a brass or other suitable block 3 that is, in turn, attached to the frame or support 63 in any desired manner, as by means of screws 2. The leads 9 and 9a may pass to the indicating instrument 64 through suitable grooves in the block 3. The lengths of the strips 5 and 7 are so chosen that the strips 7 shall lie side by side in substantially a common plane when the strips 5 are equally bowed, so as to contact or conform simultaneously with the object to be measured when the pyrometer is pressed thereagainst.

If the object the temperature of which it is desired to measure is electrically non-conductive, the thermo-couple strips 7 are pressed into direct contact therewith. If it is electrically conductive, however, some means should be employed to avoid short circuiting the thermo-couple strips 7, such as a thin, insulating film 65 interposed between the thermo-couple strips 7 and the object. This film may be constituted of a sheet of very thin paper, or a coat of oxide or varnish on the object or on the thermo-couple strips 7.

It is sometimes not feasible to approach near to the object under examination. It may be in the neighborhood of a high-temperature furnace, or at an inaccessible spot, or high up, out of easy reach. The modifications of Figs. 3 to 15 render it possible to measure the temperature of objects at a distance. In these modifications, for simplicity, the pyrometer is shown as having but a single thermo-couple strip 7, but it will be understood that the multiple-strip invention of Figs. 1 and 2 may be embodied in these other modifications, also.

Referring first to Fig. 3, the bowed spring member 5 that supports the thermo-couple strip 7 is mounted on a support 11 that is adjustably mounted on a handle 13. The adjustment may be effected in any desired way, as by telescoping the support 11 upon the handle 13. The casing 1 and the frame or support 63 by which it is carried may be mounted on the outer handle 13 or in any other convenient position. A further range of longitudinal adjustment may be had by interposing one or more members 12 telescoping between the members 11 and 13. The telescoping member comprising members 11 and 13 or 11, 12, and 13, constitutes an elongated extension of frame 63. To adapt the instrument for use with inaccessible objects that are variably positioned, the thermo-couple strip 7 is made angularly adjustable upon the support 11. To this end, according to the modification of Figs. 3, 4, and 5, the spring member 5 is clamped between the head 10 of the support 11 and a washer 14 by means of a shouldered hollow bush bolt 15 and a nut 16. The spring member 5 and the washer 14 are friction tight when the member 5 is bowed, and are capable of rotation through an angle of about 90°. The degree of rotation is limited by a pin 17 working on a quadrantal recess in the manner of an ordinary gas tap.

The attachment of the thermo-couple strip 7 to the spring member 5 is similar to that already described with reference to Figs. 1 and 2. The insulated leads 9 and 9a pass through the hollow bush 15, as shown, into the head portion of the telescoping member comprising members 11, 12, and 13 and are wound helically around an inner telescoping member composed of rods 18, 19, 20, as shown in Fig. 3; leads 9 and 9a are anchored to, but insulated from, the outer section 20 of the inner telescoping member, prior to their connection to the indicating instrument in casing 1. The leads will thus extend and return, being mounted on the telescoping inner rod member 18, 19, 20, without entanglement or chafing.

According to the modification of Fig. 6, the adjustment of the thermo-couple-carrying spring member 5 is effected by mounting it upon an attachment 22 that is swiveled upon a forked end 21 of the support 11. A thumb screw 23 and a bolt 24 serve to lock the attachment 22 in angularly adjusted positions on the support 11. The thermo-couple is thus adapted to pivot, not only in the plane illustrated in connection with Fig. 3, but also in a plane at right angles thereto, by reason of the novel adjustment about the bolt 24. The elongated extension 11, 12, and 13 is also rotatably adjustable about the axis of the parts 11, 12 and 13, as is described more fully in connection with Fig. 10, so as to permit turning the instrument-containing casing 1 about the said extension. In this manner, it is possible to turn the instrument about the extension 11, 12, and 13 toward the observer if, after the thermo-couple has been adjusted in its two pivotal planes, the face of the instrument should happen to be positioned on the side of the extension opposite to the observer.

Instruments having thermo-couple strips shaped as above described are obviously more particularly adapted for the temperature measurement of objects having convex surfaces, like cylindrical rollers. Modifications adapted for the measurement of the temperature of flat or concave surfaces are shown in Figs. 7 to 13. According to the construction illustrated in Figs. 7, 8, and 9, the handle 13 (Fig. 3) is provided with a hollow supporting tubular member 25 that terminates in a fitting 26. A bush 27 is mounted in the end of the fitting 26 with a sliding fit and is secured therein by means of a grub screw 28. The outside of the outer end of the bush 27 is threaded to accommodate a gland nut 29. The bush 27 is turned to a conical shape inside and encloses a split fibre bush 30. The thermo-couple strip 7 is bent into loop shape, as shown in Fig. 7, against a correspondingly looped backing or supporting strip 31 of spring steel or other suitable resilient metal, and the ends of the strips 7 and 31 are inserted in the split bush 30. When the nut 29 is tightened, the parts of the bush 30 are forced into clamping engagement with the ends of the strips 7 and 31 to hold them firmly in place. The free ends of the thermo-couple strip are connected in any suitable manner to the usual leads which traverse the hollow member 25 and are connected to the indicator.

The thermo-couple strip 7 or the supporting strip 31 may be coated with a suitable insulating, preferably heat-resisting, composition in order to insulate the strips electrically from the supporting strip 31, and as an additional precaution a thin strip of mica 32 may be clamped between the supporting strip and the thermo-couple strip.

The member 25 may itself carry the handle 1a and the casing 1, or, being made of any convenient length, it may be telescopingly mounted in an outer tube 34, to which the handle and the casing are adjustably secured by clips 35, as illustrated in Fig. 10. The member 25 and tube 34 correspond to the extension of the frame in Fig. 3. A screw 37 upon the member 25 extends into a transverse quadrantal slot 36 in the tube 34, in order to limit the rotative movement of the member 25 in the tube to an arc of ninety degrees. The slot 36 extends over a considerable length of the tube 34. The member 25 is further provided with longitudinal saw-cuts 33 to provide for holding it frictionally in any desired rotatably adjusted position.

The loop illustrated in Fig. 7 is suitable for use with comparatively small concave surfaces and, indeed, with small surfaces of any kind, such as the base of a cylindrical vessel. Where a loop of smaller curvature is requisite, but using the same length of thermo-couple strip, the modification illustrated in Figs. 10 to 13 may be adopted. The thermo-couple strip 7 is backed against the spring supporting strip 31, with the mica separating strip 32 interposed, as before described. The parts are held together by bushed and insulated screws 43, 44 and the mica strip extends to points 39 and 40, just beyond the screws 43 and 44. The ends of the backing strip 31 are slotted, as shown more particularly in Fig. 13, and extend beyond the ends 43a and 44a of the thermo-couple strip 7. The structure of Fig. 13 is bent into loop shape, as shown in Figs. 10 and 11, mounted obliquely with respect to a block 41, as illustrated in Fig. 10, and secured in position by bushed screws 42 that engage the slotted ends of the strip 31 and screw into a member 38. The member 38 is locked in pivotally adjusted position between the bifurcations at the free end of the member 25 by means of a bolt and thumb screw, fully illustrated in Fig. 10.

The bushed screws 42 serve also to clamp two lugs 45 and 46 between the block 38 and a block 41. The lugs 45 and 46 are insulated from the blocks 38 and 41 and connect the free ends 43a and 44a of the thermo-couple strip 7 to the indicating instrument (not shown) by means of the leads 9 and 9a. The lugs 45 and 46 are preferably made of the same metals as the corresponding ends of the thermo-couple strip 7.

The telescoping adjustment of the member 25, and its rotary adjustment in the tube 34, together with the pivotal adjustment of the member 38 and the oblique mounting of the loop, which thus make it possible to adjust the thermo-couple pivotally or rotatably in three directions at right angles to one another, as has been described also in connection with Figs. 3 to 6, provide for a high degree of adaptability.

A simple and inexpensive means for supporting the thermo-couple strip at a distance from the operator when the object to be measured is excessively hot, is illustrated in Figs. 14 and 15. Two resilient metallic tubes 47, 48 are mounted, as shown, in a handle portion 49. Leads 50, 51 made of the respective thermo-couple metals, traverse these tubes and are insulated therefrom, by asbestos tubes 52. Each tube 52 extends for the greater part of the length of the leads 50, 51, the final portions, however, being each insulated by a silica tube 53. The outer ends of the leads 50 and 51 are formed, as shown, into projections which extend into holes pierced in the ends of the thermo-couple strip 7. Tensioning of the strip is obtained by the locked toggle hinges 54, 55 pivoted at 56, 57, and 58 and locked in the usual manner at 59. The inner ends of the leads 50 and 51 are joined to the usual leads 9, 9a in the handle member 49 and these leads emerge from the handle through a bush 60 and protecting spring 61, as shown.

The handle portion 49 may be furnished with a hook 62 for hanging the apparatus, when not in use, and the indicator to which the leads 9 and 9a are attached may be placed in any convenient position, or may be attached permanently to the handle portion 49, if desired.

The invention may be embodied in other specific forms also without departing from the spirit or essential attributes thereof, and it is therefore desired that the embodiments thereof that are described herein and illustrated in the accompanying drawings be considered in all respects as illustrative and not restrictive, reference being had to the appended claims rather than to the foregoing description to indicate the scope of the invention.

What is claimed is:

1. A pyrometer comprising a plurality of thin, sensitive, thermo-couple strips disposed side by side, means for holding the strips stretched to tension them, whereby the strips are adapted simultaneously to contact yieldingly with the surface of an object in response to pressure exerted on the strips toward the object, means electrically connecting the strips together in series, an indicator, and means connecting the strips in circuit with the indicator.

2. A pyrometer comprising, a plurality of thermo-couple strips detachably supported at two points so as to cause the strips to lie side by side and adapted to contact simultaneously with the surface of an object at an intermediate point of each strip in response to pressure exerted at the two points towards the object, an indicator, and means for connecting a plurality of the thermo-couples in circuit with the indicator.

3. A pyrometer comprising, a handle, a block, a flat spring intermediately secured to the block and bent into arcuate form, a conducting projection mounted on and insulated from each end of the spring, a thermo-couple having an opening at each end, the projections being detachably mounted in the openings, the projections serving also as lead terminals, a lead connected with each terminal, the thermo-couple being adapted to contact with the surface of an object in response to pressure exerted on the thermo-couple towards the object by the handle, and an indicator connected in circuit with the leads.

4. A pyrometer comprising, a handle, a plurality of flat springs intermediately supported and bent into arcuate form, a plurality of thermo-couples connected together in series, the ends of each thermo-couple being secured to the ends of a corresponding spring, the thermo-couples being adapted to lie side by side and an intermediate portion of each thermo-couple being adapted to contact with the surface of an object in response to pressure exerted on the thermo-couples towards the object by the handle, an indicator, and means for connecting the thermo-couples in circuit with the indicator.

5. A pyrometer comprising a support, a flat spring intermediately secured to the support and bent into arcuate form, a thin, sensitive thermo-couple strip detachably supported at two points on the flat spring so as to be tensioned thereby, whereby the strip is adapted to contact yieldingly with the surface of an object in response to pressure exerted on the strip toward the object, means for insulating the strip from the object during the exertion of the pressure, an indicator, and means connecting the strip in circuit with the indicator.

6. A pyrometer comprising a handle, an elongated member secured to the handle and adjustable in the direction of its length, a thermo-couple carried by the member and adapted to conform with the surface of an object in response to pressure exerted on the thermo-couple towards the object, and an indicator carried by the handle and connected in circuit with the thermo-couple.

7. A pyrometer comprising two members, one a handle and the other a member telescopically adjustable with respect to the handle, a thermo-couple carried by the said other member, one of the members being hollow and having a rod therein that is telescopically adjustable with respect to the other member, the thermo-couple being adapted to conform with the surface of an object in response to pressure exerted on the thermo-couple towards the object, an indicator, and leads connecting the indicator in circuit with the thermocouple, the leads being mounted on the rod.

8. A pyrometer comprising a frame, an extension carried by the frame, the extension being longitudinally adjustable, a thermo-couple carried by the extension and adapted to conform with the surface of an object in response to pressure exerted on the thermo-couple towards the object, the thermo-couple being pivotally adjustably carried by the extension, and an indicator connected in circuit with the thermo-couple.

9. A pyrometer comprising a frame, an elongated member carried by the frame and adjustable with respect to the frame in the direction of its length, a flat spring intermediately pivotally adjustably carried at the free end of the extension and bent into arcuate form, a thermo-couple the ends of which are secured to the ends of the spring, the thermo-couple being adapted to conform with the surface of an object in response to pressure exerted on the thermo-couple toward the object, and an indicator carried by the frame and connected in circuit with the thermo-couple.

10. A pyrometer comprising a frame, a handle carried by the frame, an elongated member carried by the frame and adjustable with respect to the frame in the direction of its length, a flat spring intermediately pivotally adjustably carried at the free end of the extension and bent into arcuate form, a thermo-couple the ends of which are secured to the ends of the spring, the thermo-couple being adapted to conform with the surface of an object in response to pressure exerted on the thermo-couple toward the object, and an indicator carried by the frame and connected in circuit with the thermo-couple.

11. A pyrometer comprising a frame, a handle carried by the frame, the frame having an elongated extension, a member pivotally carried at the free end of the extension to swing in a plane, a thermo-couple carried by the member to swing in a plane at right angles to the first-named plane, the thermo-couple being adapted to conform with the surface of an object in response to pressure exerted on the thermo-couple toward the object, and an indicator carried by the frame and connected in circuit with the thermo-couple.

12. A pyrometer comprising a frame, an extension carried by the frame, a thermo-couple, means connecting the ends of the thermo-couple with the extension, whereby an intermediate portion of the thermo-couple is adapted to conform with the surface of an object in response to pressure exerted on the thermo-couple towards the object, the extension being longitudinally adjustable relative to the frame, and an indicator carried by the frame and connected in circuit with the thermo-couple.

13. A pyrometer comprising a frame, an extension carried by the frame, a thermo-couple, means connecting the ends of the thermo-couple with the extension, whereby an intermediate portion of the thermo-couple is adapted to conform with the surface of an object in response to pressure exerted on the thermo-couple towards the object, the extension being rotatably adjustable relative to the frame, and an indicator carried by the frame and connected in circuit with the thermo-couple.

14. A pyrometer comprising a frame, a handle carried by the frame, the frame having an elongated extension about which the frame is relatively rotatably adjustable, a member pivotally carried at the free end of the extension, a thermo-couple carried by the member, the thermo-couple being adapted to conform with the surface of an object in response to pressure exerted on the thermo-couple toward the object, and an indicator carried by the frame and connected in circuit with the thermo-couple.

15. A pyrometer comprising a frame, a thin, flexible, sensitive, thermo-couple strip having a junction at an intermediate point, means connecting the ends of the thermo-couple strip with the frame, whereby a portion of the thermo-couple strip containing the said junction is adapted to conform with the surface of an object in response to pressure exerted on the thermo-couple strip towards the object, the thermo-couple strip being universally pivotally adjustable relatively to the frame, and an indicator carried by the frame and connected in circuit with the thermo-couple strip.

16. A pyrometer comprising a frame having an elongated extension, a thin, flexible, sensitive, thermo-couple strip having a junction at an intermediate point, means connecting the ends of the thermo-couple strip with the free end of the extension, whereby a portion of the thermo-couple strip containing the said junction is adapted to conform with the surface of an object in response to pressure exerted on the thermo-couple strip towards the object, the thermo-couple strip being pivotally adjustable relative to the extension in two planes at right angles to each other, and an indicator carried by the frame and connected in circuit with the thermo-couple strip.

JOHN LIDDON ORCHARD.